United States Patent Office 3,826,725
Patented July 30, 1974

3,826,725
BREAKING OF OIL-IN-WATER EMULSIONS
John W. Schick, Cherry Hill, and Donald R. Cushman, Wenonah, N.J., assignors to Mobil Oil Corporation
No Drawing. Filed Nov. 30, 1972, Ser. No. 311,030
Int. Cl. B01k 3/04; C02b 1/82
U.S. Cl. 204—149          8 Claims

ABSTRACT OF THE DISCLOSURE

A method is provided for breaking an oil-in-water emulsion, which comprises: adjusting the emulsion with an electrolyte to a pH not higher than about 4; and transmitting direct electric current through the thus-adjusted emulsion to obtain a pH of at least 5, whereby the emulsion is resolved into a water phase and an oil phase.

BACKGROUND OF THE INVENTION

Field of the Invention

This invention relates to oil-in-water emulsions and, in one of its aspects, relates more particularly to the breaking of oil-in-water emulsions to facilitate disposal. More particularly, in this aspect, the invention relates to an improved method for breaking oil-in-water emulsions, whereby minimum hydrocarbon limits for disposal provided by the Environmental Protection Agency can easily be met.

Description of the Prior Art

In order to facilitate disposal, it is desirable to resolve oil-in-water emulsions into a water phase and an oil phase. The resulting water phase, having only a slight hydrocarbon content, can be subjected to filtration and thus meet minimum hydrocarbon limits for disposal (approximately 15 p.p.m.) as prescribed by the Environmental Protection Agency. The separated oil phase may be utilized, if so desired, for various purposes.

In accordance with present practice, the resolution of oil-in-water emulsions involves the addition of relatively large quantities of acidic materials, e.g. sulfuric acid, to the emulsion, and then heating the thus-treated emulsion to temperatures of the order of 140–180° F. for a period of several hours to achieve phase separation. The separation of the water phase thereafter necessitates neutralization and filtration through such media as filter-aid and activated charcoal to meet the aforementioned Environmental Protection Agency hydrocarbon limits. In essence, therefore, the breaking of oil-in-water emulsions, in accordance with present-day practice, necessitates an objectionably high expense through the use of large quantities of acids, high heat requirements, and accompanied by the additional steps of neutralization and filtration of the separated water phase.

Summary of the Invention

In accordance with the present invention, a simple, effective and relatively inexpensive method is provided for breaking oil-in-water emulsions. In general, as more fully hereinafter described, this method comprises adjusting the emulsion with an electrolyte to a pH not higher than about 4. Through the thus-adjusted emulsion, there is transmitted direct electric current in order to obtain a pH of at least about 5, whereby the emulsion is resolved into a water phase and an oil phase, in which the water phase, after conventional filtration, is found to meet the aforementioned Environmental Protection Agency hydrocarbon limits for easy disposal.

In general, in carrying out the process of the present invention, as hereinbefore indicated, sufficient electrolyte is added to the oil-in-water emulsion to adjust the pH not higher than about 4, and preferably from about 2 to about 3. As the electrolyte, liquid acids such as sulfuric acid and acetic acid may be employed. Also, solid acids such as p-toluene sulfonic acid, oxalic acid and tartaric acids may be employed. In addition, various salts may be employed as the electrolyte, such as alum or calcium chloride.

The mechanism involved in the emulsion breaking procedure is dependent on the formation of aluminum hydroxide as a floc. As the hydroxide forms first as a colloidal suspension, oil preferentially adsorbs onto the surface. This floc-preferential adsorption phenomenon appears dependent on solution pH. As the pH approaches the critical point of 5, the aluminum hydroxide colloid particles agglomerate into a visible floc and settle out. When this occurs, the major portion of the oil particles are adsorbed leaving a relatively oil-free water phase. The step wise reactions can be illustrated as follows:

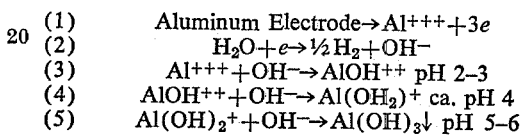

(1)    Aluminum Electrode→Al$^{+++}$+3e
(2)    $H_2O + e \rightarrow \frac{1}{2}H_2 + OH^-$
(3)    Al$^{+++}$+OH$^- \rightarrow$AlOH$^{++}$ pH 2–3
(4)    AlOH$^{++}$+OH$^- \rightarrow$Al(OH$_2$)$^+$ ca. pH 4
(5)    Al(OH)$_2^+$+OH$^- \rightarrow$Al(OH)$_3\downarrow$ pH 5–6

In Step (5) the colloidal aluminum hydroxide begins forming followed by eventual agglomeration with a flocculant precipitate. Unlike the conventional acid breaking processes, the pH of the final water phase solution automatically reaches a satisfactory level without resorting to a separate neutralization step. Thus, in commercial practice, the system can be connected to a pH meter which automatically cuts off current flow when the pH reaches the desired level. This set-up permits unattended emulsion breaking during off-peak hours.

It should also be noted that the technique is both time and current flow dependent. Electrode design and particularly exposed surface area become important since the formation of aluminum ions is the heart of the process. Electrodes of aluminum mesh arranged in tubular concentric fashion are desirable. Using the walls of a kettle as one electrode is not recommended because of inherent corrosion problems.

On a comparative basis, with relation to the practice of the prior art, the resolution of oil-in-water emulsions, in accordance with the present invention, does not necessitate the addition of relatively large quantities of acidic materials to the emulsion, and does not necessitate heating the thus-treated emulsion to temperatures above room temperature. Furthermore, the subsequent separation of the water phase does not necessitate neutralization and unusual filtration, thereby avoiding objectionably high expense through the use of relatively large quantities of acid, high heat requirements and the accompaniment of the additional steps of neutralization and special filtration of the separated water phase.

DESCRIPTION OF SPECIFIC EMBODIMENTS

The following examples and comparative data will serve to illustrate the efficacy and relative simplicity of resolving oil-in-water emulsions in accordance with the process of the present invention in accordance with acceptable hydrocarbon limits of the Environmental Protection Agency with respect to the separated water phase.

A typical oil-in-water emulsion was subjected to the novel emulsion breaking process of the present invention. This emulsion, comprising a typical cutting oil lubricant comprised, approximately, by weight, of 79% mineral oil, 18% of a soap emulsifier and 3% of a mixture of biocidal and stabilizing agents. This soluble oil cutting fluid was prepared by diluting the above-described emulsion with water in a weight ratio of 50:1.

A source of direct current, varying from a single 6 volt dry cell to an AC-DC rectifier (viz. 12 volt battery charger), was employed. A pair of aluminum electrodes was employed. Sufficient electrolyte was added to the emulsion for adjusting the pH to about 4. Various electrolytes were employed for this purpose, and the effects of variation in acids, salts, and the amount of current on breaking time, are shown in the following table. In each example, passage of the direct current through the electrolyte-adjusted emulsion resulted in raising the pH to at least 5 before phase separation occurred.

TABLE

Emulsion breaking

| Ex. | Electrolyte Type | Wt., g. | Current, milliamperes | Breaking time, minutes |
|---|---|---|---|---|
| 1 | Sulfuric acid | 0.75 | 1,000 | 6 |
| 2 | do | 0.5 | 1,000 | 12 |
| 3 | do | 1.1 | 500 | 10 |
| 4 | do | 0.75 | 250 | 20 |
| 5 | p-Toluene sulfonic acid | 0.75 | 1,000 | 8 |
| 6 | do | 0.75 | 500 | 13 |
| 7 | do | 1.0 | 250 | 30 |
| 8 | Acetic acid | 0.25 | 1,000 | 10 |
| 9 | do | 0.9 | 250 | 50 |
| 10 | Oxalic acid | 0.75 | 1,000 | 22 |
| 11 | do | 1.0 | 250 | 68 |
| 12 | Tartaric acid | 1.0 | 250 | 34 |
| 13 | Alum | 0.2 | 1,000 | 4 |
| 14 | Calcium chloride | 1.0 | 1,000 | 5 |

The emulsion breaking process can be carried out, in the manner hereinbefore described, employing various types of apparatus and techniques. For example, the process can be carried out in a separatory funnel and the water phase can easily be removed through the stopcock. Separation can also be carried out in a beaker, wherein the oil phase can be removed by a suction tube.

From the foregoing comparative data and observations, it will be apparent that the present invention provides an improved process for breaking oil-in-water emulsions, not requiring the addition of relatively large quantities of acidic materials to the emulsion, nor the necessity of employing large quantities of heat for breaking the emulsion. In addition, the process of the present invention does not necessitate neutralization of the separated water phase or filtration through unusual materials.

While preferred embodiments of the novel process of the present invention have been described for the purpose of illustration, it will be understood that various modifications and adaptations thereof, which would be obvious to those skilled in the art, may be made without departing from the spirit of the invention.

We claim:

1. A method for breaking an oil-in-water emulsion which comprises: adjusting said emulsion with an electrolyte to a pH not higher than about 4; and transmitting direct electric current through the thus-adjusted emulsion in the presence of an aluminum electrode to obtain a pH of at least about 5, whereby the emulsion is resolved into a water phase and an oil phase.

2. A method as defined in claim 1 wherein the emulsion is adjusted with the electrolyte to a pH from about 2 to about 3.

3. A method as defined in claim 1 wherein the electrolyte comprises sulfuric acid.

4. A method as defined in claim 1 wherein the electrolyte comprises p-toluene sulfonic acid.

5. A method as defined in claim 1 wherein the electrolyte comprises acetic acid.

6. A method as defined in claim 1 wherein the electrolyte comprises alum.

7. A method as defined in claim 1 wherein the electrolyte comprises calcium chloride.

8. A method as defined in claim 1 wherein the oil-in-water emulsion comprises, approximately, by weight, 79% mineral oil, 18% of a soap emulsifier and 3% of a mixture of biocidal and stabilizing agents.

References Cited

UNITED STATES PATENTS 3,673,065   6/1972   Anderson   204—149
3,664,951   5/1972   Armstrong   210—44
3,663,413   5/1972   Marmo   204—149

THOMAS M. TUFARIELLO, Primary Examiner

U.S. Cl. X.R.

210—44